C. V. MEAD.
Machine for Rolling Rubber.
No. 59,854. Patented Nov. 20, 1866.
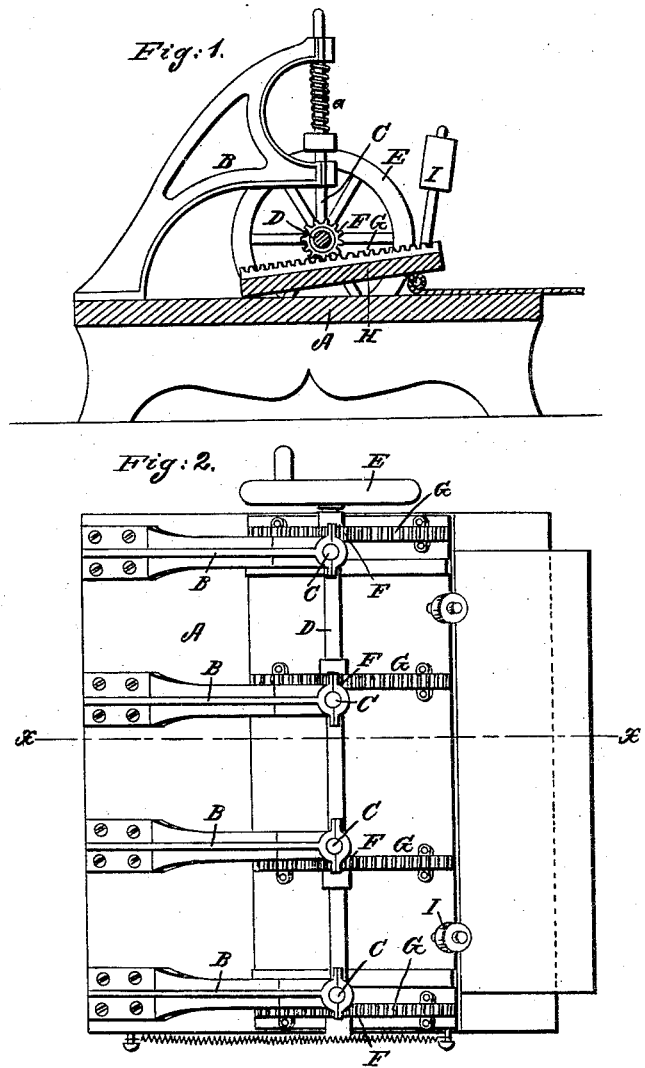

United States Patent Office.

IMPROVED MACHINE FOR ROLLING RUBBER.

CHARLES V. MEAD, OF HAMILTON, NEW JERSEY.

Letters Patent No. 59,854, dated November 20, 1866.

SPECIFICATION.

TO ALL WHOM IT MAY CONCERN:

Be it known that I, CHARLES V. MEAD, of Hamilton, in the county of Mercer, and State of New Jersey, have invented a new and improved Machine for Rolling Rubber, and I do hereby declare that the following is a full, clear, and exact description thereof, which will enable others skilled in the art to make and use the same, reference being had to the accompanying drawings forming a part of this specification, in which—

Figure 1 represents a transverse vertical section of this invention.

Figure 2 is a plan or top view of the same.

Similar letters of reference indicate like parts.

This invention relates to a machine which performs the tedious operation of rolling rubber sheets with ease and facility. It consists of a movable table to which a reciprocating motion is imparted on a suitable platform, and which is depressed upon said platform by weights or springs, or by both, in such a manner that by the action of said table a sheet of rubber placed between it and the platform is rolled up to form a roll of any desired thickness, and the operation of rolling rubber which heretofore has been performed by hand with great loss of time and labor is rendered easy.

A represents a platform made of wood or any other suitable material. From this platform rise four—more or less—standards B', which are secured near the rear edge of said platform, and extend forward over its centre as shown in the drawing. Each of these standards terminates in two arms which form the bearings for vertical arbors C, and these arbors are subjected to the action of springs $a$, which have a tendency to depress them toward the platform. The lower ends of said arbors are provided with bosses or eyes which form the bearings for a horizontal shaft D, to which a revolving motion can be imparted by a hand-wheel E, or by other suitable means. On the shaft D are mounted a series of pinions, F, which mesh in toothed racks G, secured to the upper surface of the table H, said pinions being held in gear with the racks by the springs $a$. The table H rests upon the platform A, and by turning the shaft D a reciprocating motion can be imparted to it on the platform as indicated in the drawing. Weights, I, are attached to the front part of the table, and the action of these weights may be assisted by springs, or springs may be used and the weights dispensed with altogether.

The operation is as follows: A sheet of rubber is placed on the platform A, between it and the table H, and by turning the shaft D, said table is made to move in the direction of the arrow marked on it in fig. 1. By the action of the table the rubber begins to roll, and as its thickness increases the table rises, the springs $a$ allowing it to yield without throwing the pinions out of gear with the racks, and by the weights I, or springs, the front edge of the table is depressed so that the same continues to exert the required pressure on the rubber. By these means sheets of rubber can be rolled to form rolls of any desired thickness with ease and facility.

What I claim as new, and desire to secure by Letters Patent, is—

1. Rolling rubber by the action of the reciprocating table H and platform A, substantially as herein set forth.

2. The springs $a$, in combination with the pinions F, racks G, table H, and platform A, constructed and operating substantially as and for the purpose described.

3. The weights I, or their equivalents, in combination with the table H, and platform A, constructed and operating substantially as and for the purpose set forth.

The above specification of my invention signed by me this 27th day of September, 1866.

C. V. MEAD.

Witnesses:
WM. F. MCNAMARA,
W. HAUFF.